(12) United States Patent
Griffin et al.

(10) Patent No.: US 12,346,689 B2
(45) Date of Patent: Jul. 1, 2025

(54) DYNAMIC CONTAINER LAYER SWITCHING

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 120 days.

(21) Appl. No.: 17/848,209

(22) Filed: Jun. 23, 2022

(65) Prior Publication Data
US 2023/0418594 A1   Dec. 28, 2023

(51) Int. Cl.
| | | |
|---|---|---|
| G06F 9/44 | (2018.01) |
| G06F 8/71 | (2018.01) |
| G06F 9/445 | (2018.01) |
| G06F 9/455 | (2018.01) |

(52) U.S. Cl.
CPC ..................... G06F 8/71 (2013.01)

(58) Field of Classification Search
CPC .............. G06F 8/71; G06F 9/45558
See application file for complete search history.

(56) References Cited

U.S. PATENT DOCUMENTS

| | | | |
|---|---|---|---|
| 9,110,756 B1 * | 8/2015 | Guo ........................ G06F 8/65 |
| 10,719,612 B2 | 7/2020 | Stopel et al. | |
| 10,754,677 B2 * | 8/2020 | Caro Estevez ..... G06F 16/2246 |
| 10,909,415 B2 * | 2/2021 | Li .......................... G06F 16/51 |
| 11,038,762 B2 * | 6/2021 | Harvesf .................. H04L 67/10 |
| 11,579,937 B1 * | 2/2023 | Giraldo ................. G06F 9/5072 |
| 11,650,810 B1 * | 5/2023 | Wang ......................... G06F 8/73 |
| | | | 717/148 |

(Continued)

FOREIGN PATENT DOCUMENTS

CN          114490037 A    *    5/2022

OTHER PUBLICATIONS

Jaeho Park, A Method of Dynamic Container Layer Replacement for Faster Service Providing on Resource-Limited Edge Nodes, 2019, pp. 434-437. https://ieeexplore.ieee.org/stamp/stamp.jsp?tp=&arnumber=9058586 (Year: 2019).*

(Continued)

*Primary Examiner* — Mongbao Nguyen
(74) *Attorney, Agent, or Firm* — Womble Bond Dickinson (US) LLP

(57) ABSTRACT

A system and method for dynamically switching layers of a container image for adapting performance to a computing environment. The method includes receiving a request to generate a container image including a plurality of unique layers. The method includes determining a set of optional layers for each unique layer of the container image based on a plurality of tags associated with the container image. The method includes defining one or more container image versions of the container image, wherein each container image version is defined by selecting, for each unique layer of the container image based on the plurality of tags, the unique layer of the container image or one of the optional layers of the set of optional layers associated with the unique layer. The method includes generating a first container image based on a first container image version of the one or more container image versions.

14 Claims, 6 Drawing Sheets

(56) References Cited

U.S. PATENT DOCUMENTS

| | | | | |
|---|---|---|---|---|
| 11,789,723 | B2* | 10/2023 | Suarez | G06F 8/63 |
| | | | | 713/168 |
| 11,892,418 | B1* | 2/2024 | Featonby | G06F 8/71 |
| 2017/0068676 | A1* | 3/2017 | Jayachandran | G06F 16/125 |
| 2018/0321993 | A1* | 11/2018 | McClory | H04L 41/5041 |
| 2019/0114164 | A1* | 4/2019 | Wong | G06F 8/658 |
| 2019/0310872 | A1* | 10/2019 | Griffin | G06F 8/71 |
| 2019/0354389 | A1* | 11/2019 | Du | G06F 9/45545 |
| 2020/0082094 | A1* | 3/2020 | Mcallister | G06F 8/77 |
| 2020/0184031 | A1 | 7/2020 | Horii | |
| 2020/0272427 | A1* | 8/2020 | Wang | G06F 8/63 |
| 2021/0048995 | A1* | 2/2021 | Myers | G06F 8/60 |
| 2022/0222105 | A1* | 7/2022 | Sedayao | G06F 8/63 |
| 2023/0224257 | A1* | 7/2023 | Deviprasad | H04L 47/828 |
| | | | | 709/226 |
| 2023/0244516 | A1* | 8/2023 | De Marco | G06F 8/656 |
| | | | | 718/1 |
| 2023/0266955 | A1* | 8/2023 | Li | G06F 9/45558 |
| | | | | 717/174 |
| 2023/0401050 | A1* | 12/2023 | Sree Prakash | G06F 9/455 |

OTHER PUBLICATIONS

Jonas Weber, Idiomatic and Reproducible Software Builds using Containers for Reliable Computing, 2017, pages chrome-extension://efaidnbmnnnibpcajpcglclefindmkaj/https://arxiv.org/pdf/1702.02999 (Year: 2017).*

Waheeda Syed Shameem Ahamed, Security Audit of Docker Container Images in Cloud Architecture, 2021, pp. 1-6. https://ieeexplore.ieee.org/stamp/stamp.jsp?tp=&arnumber=9478100 (Year: 2021).*

Prateek Shantharama, Hardware Acceleration for Container Migration on Resource-Constrained Platforms, 2020, pp. 1-16. https://ieeexplore.ieee.org/stamp/stamp.jsp?tp=&arnumber=9200377 (Year: 2020).*

English translation, Jiang (CN 114490037 A), 2022, pp. 1-13. (Year: 2022).*

Manish Kumar Abhishek, Framework to Secure Docker Containers, 2021, pp. 1-5. (Year: 2021).*

James Walker. "Docker Logging: Getting Started, Best Practices, and More" ContainIQ. Mar. 15, 2022.

Compose Specification Docker Documentation. Docker Docs. Apr. 4, 2022.

Quincy Wofford et al. "A Layered Approach for Modular Container Construction and Orchestration in HPC Environments" ScienceCloud '21. Jun. 21, 2021.

Abel Ombonyo. "Centralized Logging and Monitoring with Kubernetes" eKRAAL Innovation Hub. Apr. 15, 2021.

Logentries Launches All-inclusive Monitoring of Docker Environments Using Advanced Logging Container. Logentries. Jul. 23, 2015.

* cited by examiner

400

executing, in a computing environment, a first container image comprising a plurality of unique layers, wherein a first layer of the plurality of unique layers provides a service using a first set of computing resources of the computing environment
402 detecting, by a processing device, a change in one or more environmental variables associated with the computing environment during the executing of the first container image in the computing environment
404 transmitting a request to generate a second container image responsive to detecting the change in the one or more environmental variables associated with the computing environment, the request indicative of the change in the one or more environmental variables associated with the computing environment
406 receiving the second container image comprising a different plurality of unique layers
408 executing, in the computing environment, the second container image, wherein a second layer of the different plurality of unique layers provides the service using a second set of computing resources of the computing environment
410

FIG. 4

DYNAMIC CONTAINER LAYER SWITCHING

TECHNICAL FIELD

The present disclosure relates generally to software development, and more particularly, to systems and methods for dynamically switching layers of a container image for adapting performance to a computing environment.

BACKGROUND

Containerization is the packaging together of software code with all it's necessary components like libraries, frameworks, and other dependencies so that they are isolated in their own container. This is so that the software or application within the container can be moved and run consistently in any environment and on any infrastructure, independent of that environment or infrastructure's operating system. The container acts as a kind of bubble or a computing environment surrounding the application and keeping it independent of its surroundings. It is basically a fully functional and portable computing environment.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 4 is a flow diagram depicting a method for dynamically switching layers of a container image for adapting performance to a computing environment, according to some embodiments.

DETAILED DESCRIPTION

Figure 1:
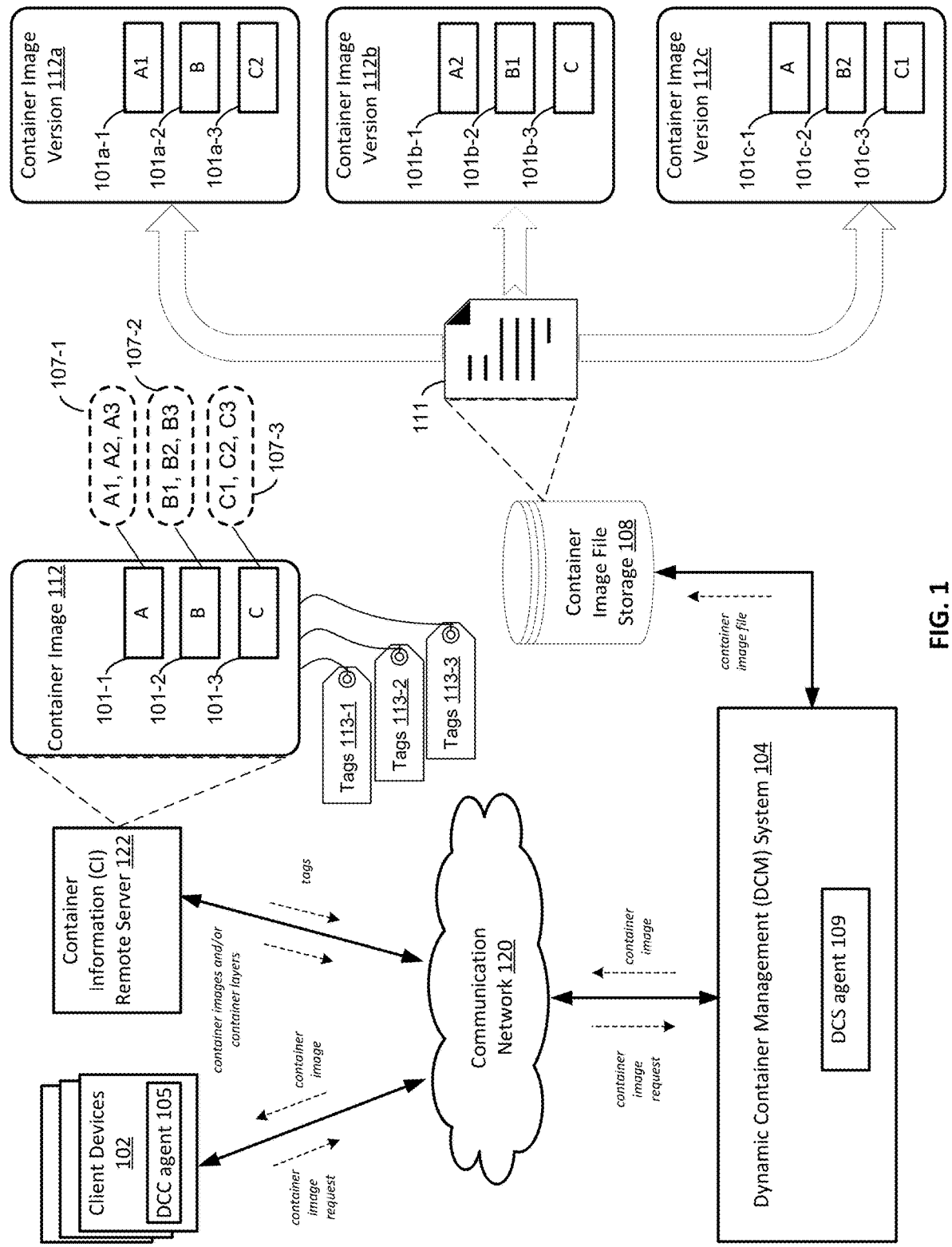
FIG. 1 is a block diagram depicting an example environment for dynamically switching layers of a container image for adapting performance to a computing environment, according to some embodiments.

Containers are built upon the concept of layers. The flexibility of layers is that they can be interchanged, meaning that a user of the container can quickly swap functionality out as needed without impacting the overall container's purpose. It is often the case that a developer designs a layer to optimally execute in certain computing environments, perhaps optimized for speed, performance, and/or accuracy. Dynamically enabling that however is a challenge that has not been addressed by the conventional system. As a result, the layers are often executing in environments in a non-optimal fashion, which may unnecessarily consume computing resources (e.g., processing, memory, storage), power, and/or networking bandwidth of the computing environment.

Aspects of the present disclosure address the above-noted and other deficiencies by dynamically switching layers of a container image for adapting performance to a computing environment. Benefits of the embodiments of the present disclosure for dynamically switching layers of a container image may include a reduction in the consumption of computing and/or networking resources to execute a container that provides one or more services to one or more computing devices.

As discussed in greater detail below, a container image as a whole would be functionally identical but for the nuances contained within the logic encoded within the optional layers (e.g., layers B1, B2). Those nuances are important as the layers could then be optimized, configuration wise, with different performance characteristics, from the amount of computing resources it can obtain and access through to specific programming techniques to optimize the layers role for speed, accuracy, quality or other metrics of importance to the user. The layers, from a metadata perspective, could be annotated or tagged by the developer to indicate their role.

A dynamic container management (DCM) system may reimage a container image file (sometimes referred to as a, "Docker File") using logical Boolean operators to control what layers could be swapped in using logical operands (e.g., OR, AND) and what layers are not compatible using NOT functionality. This would allow the DCM system to dynamically build a compatible layer and have a tree traversal style approach to building the container image to ensure compatibility and compliance with the user's requirements, which could be fed in as a list of tags (e.g., annotations). The DCM system can dynamically choose a layer that suits the user's needs and producing a valid container image. With running containers, this presents an opportunity to have intelligent load balancing style actions by deploying multiple instances of the same container with a layer change for optimized workloading for different computing environments, thereby allowing for routing of requests to a more appropriate container through a load balancer.

The DCM system can quickly adapt a layer of a container image in runtime. A container management tool (e.g., an agent) that performs the functionality of the DCM system could pre-download and cache the alternative layers and if utilizing performance metrics, could swap the layer and rebuild the container, utilizing a failover strategy such as AB testing for continuity where needed and quickly get a more optimal solution in production. This would save on round trip time and in the cases where common vulnerabilities and exposures (CVEs) or bugs were noted in a layer, have a rapid response approach to getting a compliant layer in production.

In one embodiment, a dynamic container management (DCM) system receives a request to generate a container image that includes a plurality of unique layers. The DCM system determines a set of optional layers for each unique layer of the container image based on a plurality of tags (e.g., metadata, annotations) associated with the container image. The DCM system defines one or more container image versions of the container image by selecting, for each unique layer of the container image based on the plurality of tags, the unique layer of the container image or one of the optional layers of the set of optional layers associated with the unique layer. The DCM system generates a container image file (sometimes referred to as a, "Docker File") that includes the one or more container image versions, wherein a first container image version of the one or more container image versions includes Boolean logic that indicates the set of optional layers for a first unique layer of the first container image version. The DCM system generates the first container image based on the first container image version of the one or more of container image versions by using the container image file.

FIG. 1 is a block diagram depicting an example environment for dynamically switching layers of a container image for adapting performance to a computing environment, according to some embodiments. The environment 100 includes a dynamic container management (DCM) system 104, a container information (CI) remote server 122, and one or more client devices 102 that are each communicably coupled together via a communication network 120. The environment 100 includes a container image file storage 108 that is communicably coupled to the DCM system 104. The DCM system 104 locally stores and/or executes a dynamic container service (DCS) agent 109. Each of the one or more client devices 102 locally stores and/or executes a dynamic container client (DCC) agent 105.

The communication network 120 may be a public network (e.g., the internet), a private network (e.g., a local area network (LAN) or wide area network (WAN)), or a combination thereof. In one embodiment, communication network 120 may include a wired or a wireless infrastructure, which may be provided by one or more wireless communications systems, such as wireless fidelity (Wi-Fi) connectivity to the communication network 120 and/or a wireless carrier system that can be implemented using various data processing equipment, communication towers (e.g. cell towers), etc. The communication network 120 may carry communications (e.g., data, message, packets, frames, etc.) between any other the computing device.

The CI remote server 122 is configured to store one or more unique container images 112, wherein each container image 112 includes one or more unique layers 101. One or more developers may create a layer 101 using a computing device (not shown in FIG. 1) and upload (e.g., store) the layer 101 to the CI remote server 122 via the communication network 120. As shown in FIG. 1, an example container image 112 may include a layer 101-1, a layer 101-2, and a layer 101-3 (collectively referred to as, "layers 101"). Similarly, one or more developers may create, using a computer device, a container image 112 that includes one or more layers 101 and upload the container image 112 to the CI remote server 122 via the communication network 120. Thus, the CI remote server 122 may store (a) one or more layers 101 that is standalone from a container image 112 and/or (b) one or more container images 112, where each container image 112 includes one or more layers 101.

A container image 112 is a standard unit of software that packages up code and one or more (e.g., or all) of its dependencies so that a software application may run efficiently and reliably from one computing environment to another. That is, a container image 112 is a lightweight, standalone, executable package of software that includes everything (e.g., code, runtime, system tools, system libraries and settings) needed to run an application. The container image 112 includes layers 101 (e.g., image layers) that are stacked on top of one other.

A layer 101 may include application code, libraries, system tools, dependencies, configuration/setting files, environment variables, runtimes, and other files needed to make an application execute. A layer 101 may be configured to provide a service. Non-limiting examples of a service include a database or repository service, a compute service, a file system service, a cloud storage service, an application service, a network service, a network traffic management service, a cybersecurity service, etc.

A container image 112 that includes multiple layers 101 may provide a variety of different types of services according to the layers 101, wherein each layer uses (e.g., allocates, reserves) a particular set of computing resources and a particular amount of each computing resource (e.g., computing/processing, data storage, memory) of the computing environment that executes the container image 112. For example, a first layer (e.g., layer 101-1) of container image 112 may be configured to provide a database service that uses 1 gigabyte (GB) of data storage and 100 megabytes (MB) of memory of the computing environment (e.g., a client device 102, DCM system 104), and a second layer (e.g., layer 101-2) of the container image 112 may be configured to provide a file system service that uses 0.5 gigabyte (GB) of data storage and 50 megabytes (MB) of memory of the computing environment, and a third layer (e.g., layer 101-3) of container image 112 may be configured to provide a network service that uses 200 megabytes (MB) of memory and no amount of data storage of the computing environment.

In some embodiments, the layers 101 of a container image 112 may each use a different amount of computing resources to provide an identical or substantially identical service. For example, a first layer (e.g., layer 101-1) of container image 112 may be configured to provide a database service and a second layer (e.g., layer 101-2) of container image 112 may also be configured to provide the same or substantially similar database service. However, the first layer may be configured to have a high priority status to cause the computing environment to allocate 25% of its compute (e.g., central processing unit (CPU)) resources to the first layer, and the second layer may be configured to have a low priority status to cause the computing environment to allocate 5% of its compute resources to the second layer. As such, the database service provided by the first layer may operate faster, more accurately, and/or more efficiently than the database service provided by the second layer.

A developer of a layer 101 assigns a digital tag (referred to herein as, "tag") to the layer 101, such that each layer 101 of a container image 112 is linked (e.g., associated) to a unique tag. As shown in FIG. 1, the CI remote server 122 stores a tag 113-1 that is linked to layer 101-1, a tag 113-2 that is linked to layer 101-2, and a tag 113-3 that is linked to layer 101-3 (collectively referred to as, "tags 113"). Each tag 113 (e.g., metadata, an annotation, a file, etc.) may include, for example, a description (e.g., a layer name, a layer type, a layer author name) about the corresponding layer 101, an indication of the role and/or functionality of the corresponding layer 101, and/or one or more rules for executing the corresponding layer 101. For example, tag 113-1 may indicate that layer 101-1 provides a database connection functionality to connect to a specific database (e.g., Monge, Redis, Structured Query Language (SQL), etc.)

In some embodiments, a rule may be a first rule that defines a minimum set of computing resources (e.g., hardware, software, licenses, etc.) for the corresponding layer 101 to optimally execute in a computing environment. For example, a first rule of tag 113-2 may indicate that the minimum set of computing resources for layer 101-2 to optimally execute in a computing environment is a 2 gigahertz (GHz) processor speed, 0.5 gigabyte (GB) of data storage, and 50 megabytes (MB) of memory.

In some embodiments, a rule may be a second rule that defines how an execution of one or more of other layers (e.g., layer 101-2, 101-3) of the container image 112 might interact (e.g., enhance or interfere) with the corresponding layer (e.g., layer 101-1). For example, a second rule of tag 113-2 may indicate that layer 101-2 may execute at a slower speed than its full capability if one or more of the other layers (e.g., layers 101-2, 101-3) of container image 112 are of a particular type (e.g., a database layer, a file system layer, etc.). As another example, a second rule of tag 113-2 may indicate that layer 101-2 may execute at an optimal speed so long that one or more of the other layers (e.g., layers 101-2, 101-3) of container image 112 are of a particular type (e.g., a database layer, a file system layer, etc.).

In some embodiments, a rule may be a third rule that defines the one or more optional layers (shown in FIG. 1 as, optional layers 107) that are associated with the corresponding layer 101-n. For example, the third rule may indicate that layer 101-1 (e.g., an A layer) is associated with three optional layers 107-1 (e.g., an A1 layer, an A2 layer, an A3 layer); layer 101-2 (e.g., an B layer) is associated with three optional layers 107-2 (e.g., a B1 layer, a B2 layer, a B3 layer); and/or layer 101-3 (e.g., an C layer) is associated with three optional layers 107-3 (e.g., a C1 layer, a C2 layer, a C3 layer). In some embodiments, a rule may be a fourth rule that defines a preferred ordering (e.g., 1st, $2^{nd}$, $3^{rd}$, etc.) of the corresponding layer 101-n in the container image 112 to result in an optimal performance of the layer 101-n when it executes. For example, the fourth rule may indicate that a database layer might optimally operate at its full capability if the database layer is the second layer (e.g., layer 101-2) in the container image 112, instead of the first layer (e.g., layer 101-1). As another example, the fourth rule may indicate that a database layer might optimally operate at its full capability if the database layer is the second layer (e.g., layer 101-2) or the third layer (e.g., layer 101-4) in the container image 112, instead of the first layer (e.g., layer 101-1).

As used herein, a computing environment refers to the computing resources of the computing device that are involved in the execution of the container image 112. For example, if a client device 102 is executing the container image 112 on its processing device, then the computing environment refers to the hardware (e.g., processing device, data storage, memory, etc.) and/or software (e.g., applications, available licenses, etc.) of the client device 102 that the client device 102 uses to execute the container image 112. Alternatively, if the DCM system 104 is executing the container image 112 on its processing device, then the computing environment refers to the hardware and/or software of the DCM system 104 that the DCM system 104 uses to execute the container image 112.

Differences in computing environments could impact how a layer 101-n of a container image 112 performs when executing in that computing environment. These differences may include, for example, a resource type, a resource speed, and/or an availability/amount of the resources of the computing environment. For example, layer 101-1 of container image 112 may require at least 200 MB of available memory to optimally run, but the computing environment might only have 100 MB, thereby causing the layer 101-1 to operate and/or execute at a slower speed than its full capability.

In some embodiments, a computing environment might be impacted by other environmental conditions that affect whether a layer 110 can optimally execute in the computing environment. For example, layer 101-1 of container image 112 might be a database layer that, when executing on client device 102, is configured to communicate to a remote storage via a network connection of the client device 102. However, if the network connection of the client device 102 has excessive network congestion and/or network latency, then the layer 101-1 might operate at a slower speed than its full capability. As another example, layer 101-1 of container image 112 might require access to a first type of licensed software in order to optimally execute. However, if client device 102 only has a license to access a second type of licensed software, then certain features of the layer 101-1 may operate at a reduced speed or be disabled. As another example, layer 101-1 of container image 112 might require a user operating the client device 102 that executes the container image 112 to have administrative rights to read/write a secured region of file system of the client device 102. However, if the user does not have these administrative rights, then certain features of layer 101-1 may operate at a reduced speed or be disabled.

Still referring to FIG. 1, the DCM system 104 executes a dynamic container service (DCS) agent 109 that receives a request (shown in FIG. 1 as, "container image request") from a client device 102 to generate a container image (e.g., container image 112) that includes one or more unique layers (e.g., layers 101), where the request includes an identifier to the container image and environment variables that are indicative of the computing environment associated with the client device 102. The DCM system 104 acquires (e.g., receive, retrieve) one or more tags (shown in FIG. 1) that are associated with the container image 112 from the CI remote server 122. In some embodiments, the DCM system 104 may acquire (e.g., receive, retrieve) the container image 112 that corresponds to the identifier, or one or more of the individual layers of the container image 112 from the CI remote server 122. The DCM system 104 determine a set of optional layers 107 for each unique layer 101 of the container image 112 based on the one or more of tags that are associated with the container image 112.

The DCM system 104 defines one or more container image versions of the container image by selecting, for each unique layer 101 of the container image 112 and based on the one or more of tags and/or the environmental variables of the client device 102, (i) the unique layer 101 of the container image 112, or (ii) one of the optional layers (e.g., optional layers 107-1, 107-2) of the set of optional layers 107 associated with the unique layer 101. As shown in FIG. 1, the DCM system 104 defines a container image version 112a that includes three layers (e.g., layer 101a-1, layer 101a-2, and layer 101a-3), where layer 101a-1 corresponds to layer A1, layer 101a-2 corresponds to layer B, and layer 101a-3 corresponds to layer C2. In this embodiment, the DCM system 104 determined that the computing environment of client device 102 allows: (i) layer A1 to run better (e.g., faster, more accurately, and/or more efficiently) than layers A, A2, A3; (ii) layer B to run better than layers B1, B2, B3; and (iii) layer C2 to run better than layers C, C1, C3.

The DCM system 104 also defines a container image version 112b that includes three layers (e.g., layer 101b-1, layer 101b-2, and layer 101b-3), where layer 101b-1 corresponds to layer A2, layer 101a-2 corresponds to layer B1, and layer 101a-3 corresponds to layer C. In this embodiment, the DCM system 104 determined that the computing environment of client device 102 allows: (i) layer A2 to run better than layers A, A1, A3; (ii) layer B1 to run better than layers B, B2, B3; and (iii) layer C to run better than layers C1, C2, C3. The DCM system 104 also defines a container image version 112*c* that includes three layers (e.g., layer 101*c*-1, layer 101*c*-2, and layer 101*c*-3), where layer 101*c*-1 corresponds to layer A, layer 101*a*-2 corresponds to layer B2, and layer 101*a*-3 corresponds to layer C1. In this embodiment, the DCM system 104 determined that the computing environment of client device 102 allows: (i) layer A to run better than layers A1, A2, A3; (ii) layer B2 to run better than layers B, B1, B3; and (iii) layer C1 to run better than layers C, C1, C3.

The DCM system 104 generates a container image file 111 (sometimes referred to as a, "Docker File") that includes the definitions for container image versions 112*a*, 112*b*, 112*c*. The DCM system 104 stores the container image file 111 in the container image file storage 108. Each definition in the container image file 111 uses conditional language (e.g., Boolean logic) to identify the specific layer (e.g., layer A, layer B, or layer C) or one of the corresponding optional layers 107) that should be selected for each layer of the container image 112 given a particular set of environment variables that are associated with the client device 102. The DCM system 104 generates a container image 112 that corresponds to one of the container image versions 112*a*, 112*b*, 112*c* based on the container image file 111 and the environment variables that are associated with the client device 102. The DCM system 104 transmits the container image 112 to the client device 102.

Although FIG. 1 shows only a select number of computing devices (e.g., DCM system 104, client devices 102, CI remote server 122), and data storages (e.g., container image file storage 108); the environment 100 may include any number of computing devices and/or data volumes that are interconnected in any arrangement to facilitate the exchange of data between the computing devices. Furthermore, for ease of explanation, FIG. 1 shows that CI remote server 122 stores only one container image 112, which includes only three layers 101 that are each associated with only three optional layers 107 (e.g., layer 101-1 associated with layers A1, A2, A3; layer 101-2 associated with layers B1, B2, B3; layer 101-3 associated with layers C1, C2, C3). However, in other embodiments, CI remote server 122 may store any number of container images 112, that may each include any number of layers 101 that are each associated with any number of optional layers 107.

Figure 2B:
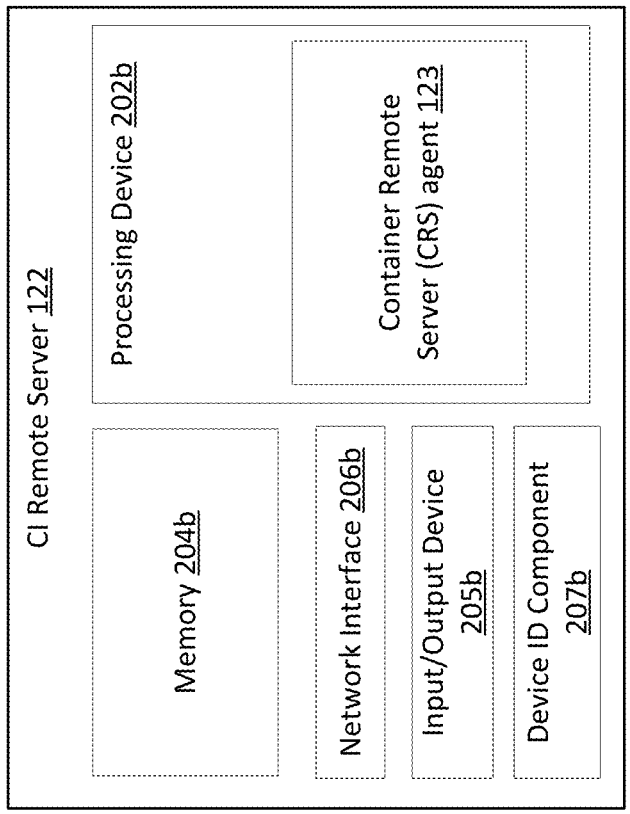
FIG. 2B is a block diagram depicting an example of the container information (CI) remote server 122 of the environment in FIG. 1, according to some embodiments.
Figure 2A:
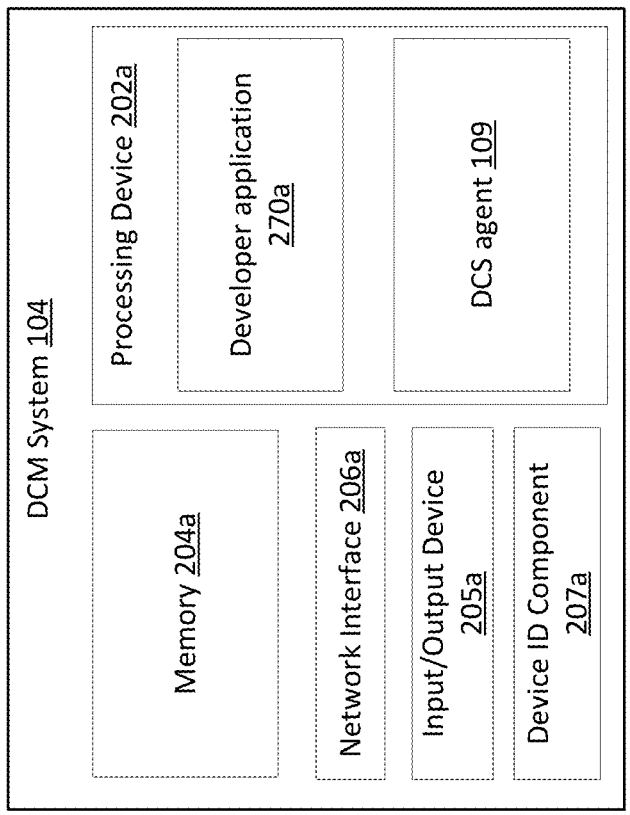
FIG. 2A is a block diagram depicting an example of the dynamic container management (DCM) system 104 in FIG. 1, according to some embodiments.

FIG. 2A is a block diagram depicting an example of the dynamic container management (DCM) system 104 in FIG. 1, according to some embodiments. While various devices, interfaces, and logic with particular functionality are shown, it should be understood that the DCM system 104 includes any number of devices and/or components, interfaces, and logic for facilitating the functions described herein. For example, the activities of multiple devices may be combined as a single device and implemented on a same processing device (e.g., processing device 202*a*), as additional devices and/or components with additional functionality are included.

The DCM system 104 includes a processing device 202*a* (e.g., general purpose processor, a PLD, etc.), which may be composed of one or more processors, and a memory 204*a* (e.g., synchronous dynamic random access memory (DRAM), read-only memory (ROM)), which may communicate with each other via a bus (not shown).

The processing device 202*a* may be provided by one or more general-purpose processing devices such as a microprocessor, central processing unit, or the like. In some embodiments, processing device 202*a* may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202*a* may comprise one or more special-purpose processing devices such as an application specific integrated circuit (ASIC), a field programmable gate array (FPGA), a digital signal processor (DSP), network processor, or the like. The processing device 202*a* may be configured to execute the operations described herein, in accordance with one or more aspects of the present disclosure, for performing the operations and steps discussed herein.

The memory 204*a* (e.g., Random Access Memory (RAM), Read-Only Memory (ROM), Non-volatile RAM (NVRAM), Flash Memory, hard disk storage, optical media, etc.) of processing device 202*a* stores data and/or computer instructions/code for facilitating at least some of the various processes described herein. The memory 204*a* includes tangible, non-transient volatile memory, or non-volatile memory. The memory 204*a* stores programming logic (e.g., instructions/code) that, when executed by the processing device 202*a*, controls the operations of the DCM system 104. In some embodiments, the processing device 202*a* and the memory 204*a* form various processing devices and/or circuits described with respect to the DCM system 104. The instructions include code from any suitable computer programming language such as, but not limited to, C, C++, C #, Java, JavaScript, VB Script, Perl, HTML, XML, Python, TCL, and Basic.

The processing device 202*a* may include and/or execute an application (shown in FIG. 2A as, "Developer Application 270*a*") that is displayed on a computer screen of the DCM system 104, and is configured to allow a user of the DCM system 104 to use operating system (OS)-level virtualization to package software into a container image (e.g., container image 112) and to execute the container image. For example, the developer application 270*a* may be configured to generate (e.g., create, build) a container image 112 using one or more files (e.g., container image file, Docker file) of a software application project. In some embodiments, the developer application 270*a* may be the open-source version of Docker. In some embodiments, the developer application 270*a* includes an application programming interface (API; sometimes referred to as, "Docker API") for interacting with a daemon (sometimes referred to as, "Docker Engine API"), as well as software development kits (SDKs). In some embodiments, the SDKs allow a user of the DCM system 104 to build and scale applications (e.g., Docker apps) and solutions quickly and easily. In some embodiments, the developer application 270*a* is configured to display information (e.g., notifications, messages, container image requests, tags, etc.) on a screen of the DCM system 104. In some embodiments, the developer application 270*a* may be configured to perform some or all of the same functionality (as discussed herein) as the DCS agent 109 (sometimes referred to as, "container management tool").

The processing device 202*a* may execute a dynamic container service (DCS) agent 109 that is configured to receive a request (shown in FIG. 1 as, "container image request") from a computing device (e.g., client device 102, the DCM system 104) associated with a computing environment to generate a container image (e.g., container image 112) that includes one or more unique layers (e.g., layers 101), where the request includes an identifier to the container image and environment variables that are indicative of the computing environment. For example, the client device 102 may send a request to the DCS agent 109 executing on the DCM system 104 to generate a container image 112. As another example, an application executing on the DCM system 104 may send a request to the DCS agent 109 executing on the DCM system 104 to generate a container image 112. In some embodiments, the DCS agent 109 may use the developer application 270a to generate a container image 112.

In some embodiments, an environmental variable includes an indication of a current availability or current workload of one or more resources (e.g., processing resources, memory resources, storage resources, etc.) associated with the computing environment. In some embodiments, an environmental variable includes an indication of one or more license restrictions associated with the computing environment. For example, an environmental variable may indicate that a computing device (e.g., client device 102, the DCM system 104) associated with the environmental variable has licensing rights to use a version of software. Alternatively, the environmental variable may indicate that the computing device associated with the environmental variable cannot use the version of software because the computing device (or user of the computing device) does not have licensing rights to use the version of software. In some embodiments, an environmental variable includes an indication of one or more access rights of a user associated with the computing device.

The DCS agent 109 may be configured to acquire (e.g., retrieve) the container image 112 that corresponds to the identifier from the CI remote server 122. In some embodiments, the DCS agent 109 may receive the container image 112 from the client device 102. DCS agent 109 may be configured to determine the one or more layers 101 that are included in the container image 112 by analyzing the container image 112. For example, the DCS agent 109 may determine that the container image 112 includes a layer 101-1 (e.g., an A layer), a layer 101-2 (e.g., a B layer), and a 101-3 (e.g., a C layer).

The DCS agent 109 may be configured to acquire one or more tags 113 (shown in FIG. 1) that are associated with the container image 112 from the CI remote server 122. In some embodiments, the DCS agent 109 can send a request to the CI remote server 122 for the one or more tags 113 that are associated with the container image 112 to cause the CI remote server 122 to transmit the one or more tags 113 to the DCS agent 109. In some embodiments, the CI remote server 122 be may configured to periodically (e.g., daily, monthly, when new tags 113 are available, etc.) transmit the different sets of tags 113 associated with the different container images 112 that are stored in the CI remote server 122 to the DCS agent 109.

Each tag 113 (e.g., metadata, an annotation, a file, etc.) may include, for example, a description (e.g., a layer name, a layer type, a layer author name) about the corresponding layer 101, an indication of the role and/or functionality of the corresponding layer 101, and/or one or more rules for executing the corresponding layer 101. In some embodiments, a first rule that defines a minimum set of computing resources to optimally execute the unique layer of the plurality of unique layers. In some embodiments, a second rule that defines how an execution of one or more of other unique layers of the container image interact the unique layer. In some embodiments, a third rule that defines the set of optional layers 107 associated with the unique layer 101 of the plurality of unique layers 101.

The DCS agent 109 may be configured to determine a set of optional layers 107 for each unique layer 101 of the container image 112 based on the one or more of tags 113 that are associated with the container image 112. For example, the DCS agent 109 may determine that layer 101-1 is layer A, which requires at least 200 MB of available memory to optimally run. The DCS agent 109 may define an optional layer 107-1 as layer A1 that performs the same functionality as layer A, but using only 100 MB of memory. As such, layer A1 executes less optimally as compared to layer A. As another example, the DCS agent 109 may define an optional layer 107-1 as layer A2 that performs the same functionality as layer A, but using only 150 MB of memory. As such, layer A2 executes less optimally as compared to layer A, but more optimally than layer A1.

The DCS agent 109 may be configured to define one or more container image versions of the container image 112. In some embodiments, each container image version is defined by selecting, for each unique layer of the container image 112 based on the one or more tags and/or the environmental variables associated with the computing environment, the unique layer of the container image 112 or one of the optional layers 107 of the set of optional layers 107 associated with the unique layer 101. For example, DCS agent 109 may define a container image version 112a that includes three layers (e.g., layer 101a-1, layer 101a-2, and layer 101a-3), where layer 101a-1 corresponds to layer A1, layer 101a-2 corresponds to layer B, and layer 101a-3 corresponds to layer C2. The DCS agent 109 also defines a container image version 112b that includes three layers (e.g., layer 101b-1, layer 101b-2, and layer 101b-3), where layer 101b-1 corresponds to layer A2, layer 101a-2 corresponds to layer B1, and layer 101a-3 corresponds to layer C. The DCS agent 109 also defines a container image version 112c that includes three layers (e.g., layer 101c-1, layer 101c-2, and layer 101c-3), where layer 101c-1 corresponds to layer A, layer 101a-2 corresponds to layer B2, and layer 101a-3 corresponds to layer C1.

The DCS agent 109 may be configured to generate a container image file 111 (sometimes referred to as a, "Docker File") that includes the one or more container image versions of the container image 112. In some embodiments, each container image version of the one or more container image versions corresponds to a unique layer of the container image 112, and includes Boolean logic that indicates the set of optional layers 107 for a unique layer.

The DCS agent 109 may be configured to use the container image file 111 to generate a container image 112 corresponding to one of the plurality of container image versions. In some embodiments, the unique layer and each optional layer 107 of the set of optional layers 107 use different computing resources or different application programming interfaces (APIs) to provide a substantially identical service.

The DCS agent 109 may be configured to select, for each unique layer of the container image 112 based on the plurality of tags 113. In some embodiments, the DCS agent 109 may be configured to select, for a first container image version of the one or more container image versions of the container image 112, a first unique layer of the plurality of unique layers of the container image 112. In some embodiments, the DCS agent 109 may be configured to determine an incompatibility between the first unique layer 101 and a second optional layer 107 of the set of optional layers 107 associated with a second unique layer 101 of the container image 112. In some embodiments, the DCS agent 109 may be configured to select, for the first container image version responsive to determining the incompatibility, a first optional layer 107 of the set of optional layers 107 associated with the second unique layer 101 of the container image 112.

The DCS agent 109 may be configured to provide (e.g., send, transmit, deliver) a container image 112 to a computing device (e.g., client device 102, the DCM system 104) associated with a computing environment to cause a processing device of the computing device to execute the container image 112. For example, the DCS agent 109 may provide the container image 112 to the client device 102 or to the developer application 270a.

The DCS agent 109 may be configured to detect, responsive to providing the first container image to the computing environment, a change in the one or more environmental variables associated with the computing environment. For example, the DCS agent 109 can send a message that includes a software hook to the client device 102 to cause the client device 102 to install the software hook on the client device 102. Once installed, the software hook causes the client device 102 to periodically send its environmental variables to the DCS agent 109. For example, the software hook can determine that the available memory changed from 200 MB to 100 MB, and send an environmental variable to the DCS agent 109 to indicate that the available memory changed from 200 MB to 100 MB.

The DCS agent 109 may be configured to select a second container image version of the plurality of container image versions based on the change in the one or more environmental variables associated with the computing environment. The DCS agent 109 may be configured to generate a second container image based on the second container image version of the plurality of container image versions. The DCS agent 109 may be configured to provide the second container image to the computing device (e.g., client device 102, the DCM system 104) associated with the computing environment to cause one or more processors of the computing device to execute the second container image. In some embodiments, the DCS agent 109 may be configured to provide the second container image to the computing device associated with the computing environment to cause the computing device to disable (e.g., stop, terminate, teardown) the second container image prior to executing the second container image. In some embodiments, the DCS agent 109 may be configured to provide the second container image to the computing device associated with the computing environment to cause the computing device to concurrently execute the first container image and the second container image to load balance one or more workloads across the first container image and the second container image.

The DCM system 104 may be configured to store the container image file 111 in the container image file storage 108.

The DCM system 104 includes a network interface 206a configured to establish a communication session with a computing device for sending and receiving data over the communication network 120 to the computing device. Accordingly, the network interface 206A includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the DCM system 104 includes a plurality of network interfaces 206a of different types, allowing for connections to a variety of networks, such as local area networks (public or private) or wide area networks including the Internet, via different sub-networks.

The DCM system 104 includes an input/output device 205a configured to receive user input from and provide information to a user. In this regard, the input/output device 205a is structured to exchange data, communications, instructions, etc. with an input/output component of the DCM system 104. Accordingly, input/output device 205a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of DCM system 104, such as a built-in display, touch screen, microphone, etc., or external to the housing of DCM system 104, such as a monitor connected to DCM system 104, a speaker connected to DCM system 104, etc., according to various embodiments. In some embodiments, the DCM system 104 includes communication circuitry for facilitating the exchange of data, values, messages, and the like between the input/output device 205a and the components of the DCM system 104. In some embodiments, the input/output device 205a includes machine-readable media for facilitating the exchange of information between the input/output device 205a and the components of the DCM system 104. In still another embodiment, the input/output device 205a includes any combination of hardware components (e.g., a touchscreen), communication circuitry, and machine-readable media.

The DCM system 104 includes a device identification component 207a (shown in FIG. 2A as device ID component 207a) configured to generate and/or manage a device identifier associated with the DCM system 104. The device identifier may include any type and form of identification used to distinguish the DCM system 104 from other computing devices. In some embodiments, to preserve privacy, the device identifier may be cryptographically generated, encrypted, or otherwise obfuscated by any device and/or component of DCM system 104. In some embodiments, the DCM system 104 may include the device identifier in any communication (e.g., a message that includes the container image request, etc.) that the DCM system 104 sends to a computing device.

The DCM system 104 includes a bus (not shown), such as an address/data bus or other communication mechanism for communicating information, which interconnects the devices and/or components of DCM system 104, such as processing device 202a, network interface 206a, input/output device 205a, and device ID component 207a.

In some embodiments, some or all of the devices and/or components of DCM system 104 may be implemented with the processing device 202a. For example, the DCM system 104 may be implemented as a software application stored within the memory 204a and executed by the processing device 202a. Accordingly, such embodiment can be implemented with minimal or no additional hardware costs. In some embodiments, any of these above-recited devices and/or components rely on dedicated hardware specifically configured for performing operations of the devices and/or components.

FIG. 2B is a block diagram depicting an example of the container information (CI) remote server 122 of the environment in FIG. 1, according to some embodiments. While various devices, interfaces, and logic with particular functionality are shown, it should be understood that the CI remote server 122 includes any number of devices and/or components, interfaces, and logic for facilitating the functions described herein. For example, the activities of multiple devices may be combined as a single device and implemented on a same processing device (e.g., processing device 202b), as additional devices and/or components with additional functionality are included.

The CI remote server 122 includes a processing device 202b (e.g., general purpose processor, a PLD, etc.), which may be composed of one or more processors, and a memory 204b (e.g., synchronous dynamic random access memory (DRAM), read-only memory (ROM)), which may communicate with each other via a bus (not shown). The processing device 202b includes identical or nearly identical functionality as processing device 202a in FIG. 2a, but with respect to devices and/or components of the CI remote server 122 instead of devices and/or components of the DCM system 104.

The memory 204b of processing device 202b stores data and/or computer instructions/code for facilitating at least some of the various processes described herein. The memory 204b includes identical or nearly identical functionality as memory 204a in FIG. 2A, but with respect to devices and/or components of the CI remote server 122 instead of devices and/or components of the DCM system 104.

The processing device 202b may execute a container remote service (CRS) agent 123 that is configured to receive a plurality of container images 112 and a plurality of tags 113 from a computing device that is operated by one or more developers of the container image. Each container image 112 is associated (e.g., linked) to one or more tags. The CRS agent 123 is configured to store the container image 112 and the plurality of tags 113 in its local storage. The CRS agent 123 is configured to receive a request from the DCM system 104 for one or more tags 113 that are associated with a container image 112, where the request includes an identifier to the container image 113. The CRS agent 123 is configured to determine (e.g., identify) the one or more layers 101 that are included in the container image 113. The CRS agent 123 is configured to retrieve, from its local storage and for each layer 101 of the container image 113, the one or more tags 113 that are associated with the layer 101. The CRS agent 123 is configured to transmit the one or more tags 113 that are associated with the layers 101 of the container image 112 to the DCM system 104.

The CI remote server 122 includes a network interface 206b configured to establish a communication session with a computing device for sending and receiving data over a network to the computing device. Accordingly, the network interface 206b includes identical or nearly identical functionality as network interface 206a in FIG. 2A, but with respect to devices and/or components of the CI remote server 122 instead of devices and/or components of the DCM system 104.

The CI remote server 122 includes an input/output device 205b configured to receive user input from and provide information to a user. In this regard, the input/output device 205b is structured to exchange data, communications, instructions, etc. with an input/output component of the CI remote server 122. The input/output device 205b includes identical or nearly identical functionality as input/output processor 205a in FIG. 2A, but with respect to devices and/or components of the CI remote server 122 instead of devices and/or components of the DCM system 104.

The CI remote server 122 includes a device identification component 207b (shown in FIG. 2B as device ID component 207b) configured to generate and/or manage a device identifier associated with the CI remote server 122. The device ID component 207b includes identical or nearly identical functionality as device ID component 207a in FIG. 2A, but with respect to devices and/or components of the CI remote server 122 instead of devices and/or components of the DCM system 104.

The CI remote server 122 includes a bus (not shown), such as an address/data bus or other communication mechanism for communicating information, which interconnects the devices and/or components of the CI remote server 122, such as processing device 202b, network interface 206b, input/output device 205b, and device ID component 207b.

In some embodiments, some or all of the devices and/or components of CI remote server 122 may be implemented with the processing device 202b. For example, the CI remote server 122 may be implemented as a software application stored within the memory 204b and executed by the processing device 202b. Accordingly, such embodiment can be implemented with minimal or no additional hardware costs. In some embodiments, any of these above-recited devices and/or components rely on dedicated hardware specifically configured for performing operations of the devices and/or components.

Figure 2C:
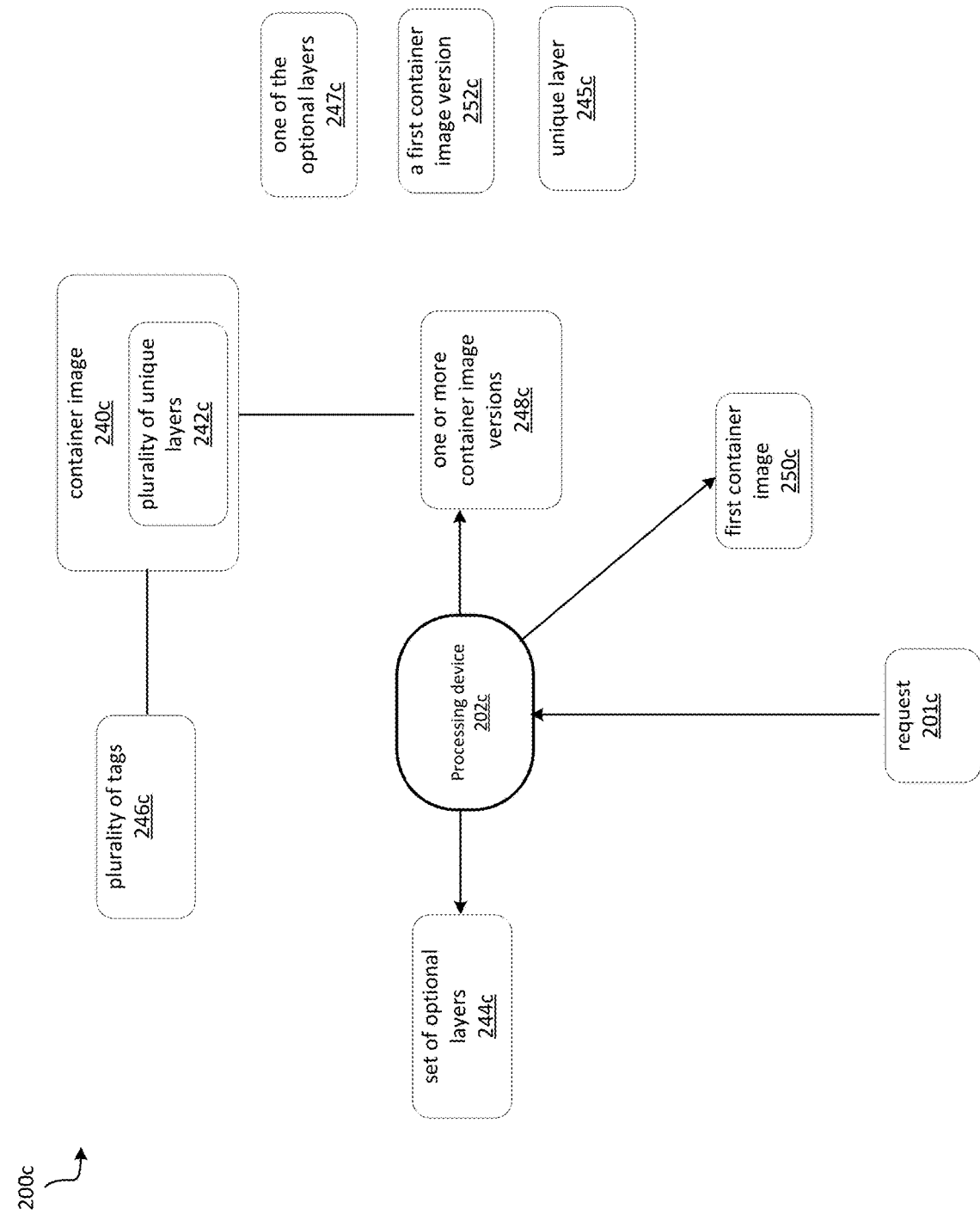
FIG. 2C is a block diagram depicting an example of the client device 102 of the environment in FIG. 1, according to some embodiments.

FIG. 2C is a block diagram depicting an example environment for dynamically switching layers of a container image for adapting performance to a computing environment, according to some embodiments. The environment 200c includes a processing device 202c (e.g., processing device 202a of DCM system 104 in FIG. 2A).

The processing device 202c receives a request 201c to generate a container image 240c comprising a plurality of unique layers 242c. The processing device 202c determines a set of optional layers 244c for each unique layer 245c of the container image 240c based on a plurality of tags 246c associated with the container image 240c. The processing device 202c defines one or more container image versions 248c of the container image 240c. Each container image version is defined by selecting, for each unique layer 245c of the container image 240c based on the plurality of tags 246c, the unique layer 245c of the container image 240c or one of the optional layers 247c of the set of optional layers 244c associated with the unique layer 245c. The processing device 202c generates a first container image 250c based on a first container image version 252c of the one or more container image versions 248c.

Figure 3:
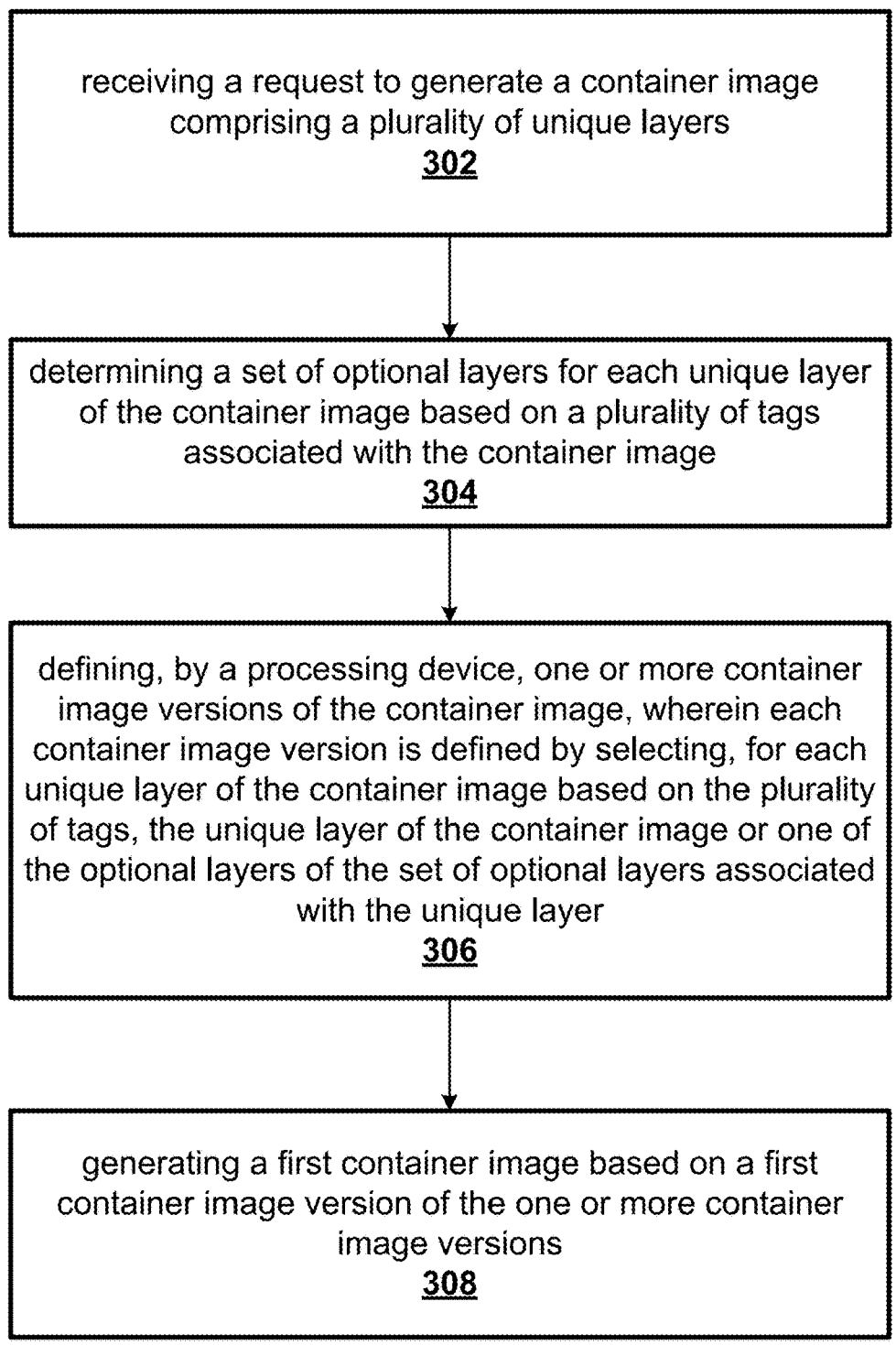
FIG. 3 is a flow diagram depicting a method for dynamically switching layers of a container image for adapting performance to a computing environment, according to some embodiments.

FIG. 3 is a flow diagram depicting a method for dynamically switching layers of a container image for adapting performance to a computing environment, according to some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 300 may be performed by dynamic container management (DCM) system, such as DCM system 104 in FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

As shown in FIG. 3, the method 300 includes the block 302 of receiving a request to generate a container image comprising a plurality of unique layers. The method 300 includes the block 304 of determining a set of optional layers for each unique layer of the container image based on a plurality of tags associated with the container image. The method 300 includes the block 306 of defining, by a processing device, one or more container image versions of the container image. In some embodiments, each container image version is defined by selecting, for each unique layer of the container image based on the plurality of tags, the unique layer of the container image or one of the optional layers of the set of optional layers associated with the unique layer. The method 300 includes the block 308 of generating a first container image based on a first container image version of the one or more container image versions.

FIG. 4 is a flow diagram depicting a method for dynamically switching layers of a container image for adapting performance to a computing environment, according to some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 400 may be performed by a client device, such as client device 102 in FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

As shown in FIG. 4, the method 400 includes the block 402 of executing, in a computing environment, a first container image comprising a plurality of unique layers, wherein a first layer of the plurality of unique layers provides a service using a first set of computing resources of the computing environment. The method 400 includes the block 404 of detecting, by a processing device, a change in one or more environmental variables associated with the computing environment during the executing of the first container image in the computing environment. The method 400 includes the block 406 of transmitting a request to generate a second container image responsive to detecting the change in the one or more environmental variables associated with the computing environment, the request indicative of the change in the one or more environmental variables associated with the computing environment. The method 400 includes the block 408 of receiving the second container image comprising a different plurality of unique layers. The method 400 includes the block 410 of executing, in the computing environment, the second container image, wherein a second layer of the different plurality of unique layers provides the service using a second set of computing resources of the computing environment.

Figure 5:
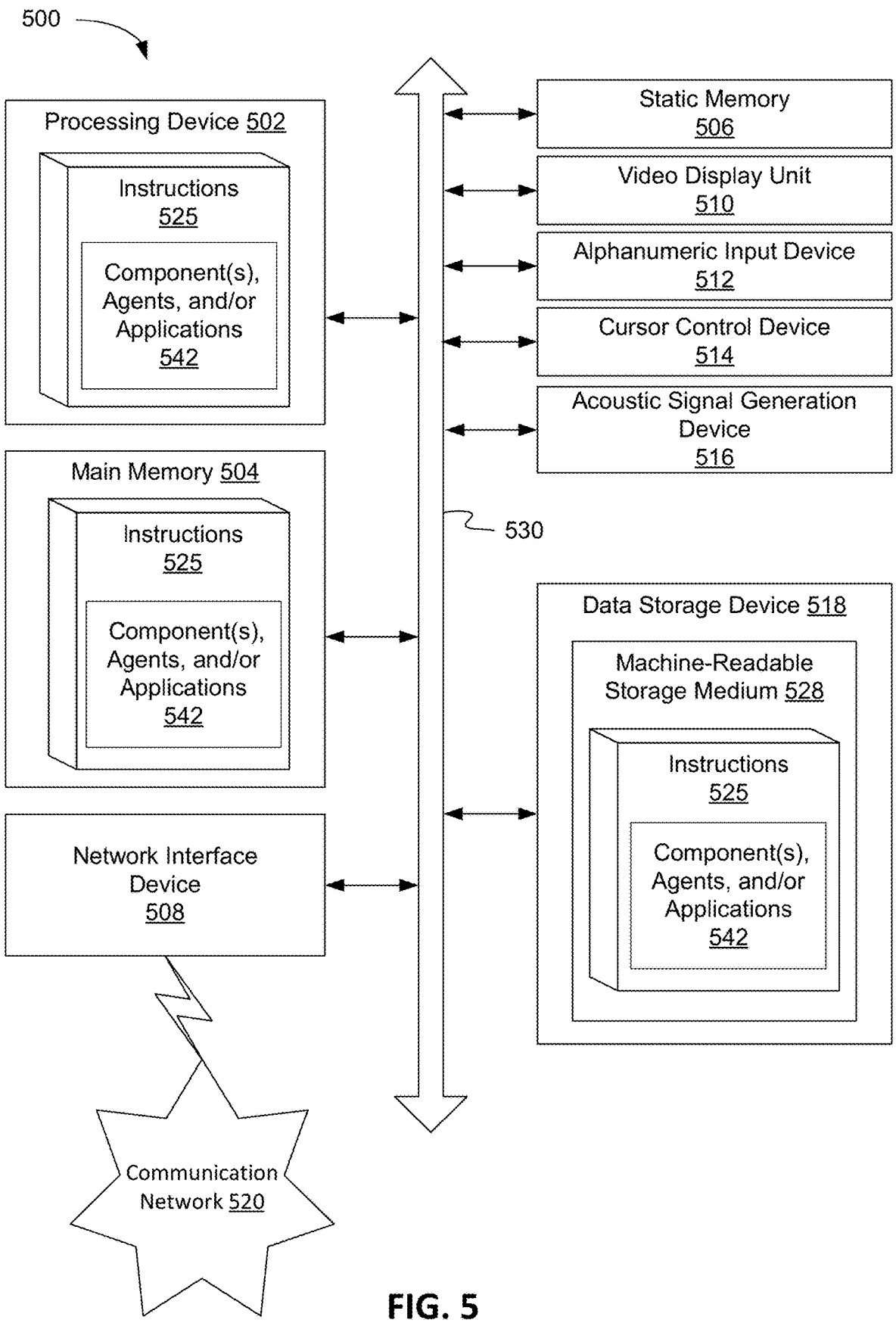
FIG. 5 is a block diagram of an example computing device 500 that may perform one or more of the operations described herein, in accordance with some embodiments.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a communication network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions 525 that may include instructions for one or more components 142 (e.g., DCS agent 109 in FIG. 2A, Container Remote Server (CRS) agent 123 in FIG. 2B) for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a communication network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising receiving a request to generate a container image comprising a plurality of unique layers; determining a set of optional layers for each unique layer of the container image based on a plurality of tags associated with the container image; defining, by a processing device, one or more container image versions of the container image, wherein each container image version is defined by selecting, for each unique layer of the container image based on the plurality of tags, the unique layer of the container image or one of the optional layers of the set of optional layers associated with the unique layer; and generating a first container image based on a first container image version of the plurality of container image versions.

Example 2 is the method of Example 1, wherein each tag is indicative of one or more rules for executing a respective unique layer of the plurality of unique layers of the container image.

Example 3 is the method of any of Examples 1-2, wherein the one or rules comprises at least one of: a first rule defining a minimum set of computing resources to optimally execute the unique layer of the plurality of unique layers; a second rule defining how an execution of one or more of other unique layers of the container image interact the unique layer; or a third rule defining the set of optional layers associated with the unique layer of the plurality of unique layers.

Example 4 is the method of any of Examples 1-3, wherein the unique layer and each optional layer of the set of optional layers use different computing resources or different application programming interfaces (APIs) to provide a substantially identical service.

Example 5 is the method of any of Examples 1-4, further comprising generating a container image file (e.g., specification file) comprising the one or more container image versions, wherein a first container image version of the one or more container image versions comprises Boolean logic that indicates the set of optional layers for a first unique layer of the first container image version, wherein generating the first container image based on the first container image version of the plurality of container image versions is further based on the container image file.

Example 6 is the method of any of Examples 1-5, wherein selecting, for each unique layer of the container image based on the plurality of tags, the unique layer of the container image or the one of the optional layers of the set of optional layers associated with the unique layer comprises: selecting, for a first container image version of the one or more container image versions of the container image, a first unique layer of the plurality of unique layers of the container image; determining an incompatibility between the first unique layer and a second optional layer of the set of optional layers associated with a second unique layer of the container image; and selecting, for the first container image version responsive to determining the incompatibility, a first optional layer of the set of optional layers associated with the second unique layer of the container image.

Example 7 is the method of any of Examples 1-6, further comprising providing the first container image to a computing environment to cause one or more processors of the computing environment to execute the first container image.

Example 8 is the method of any of Examples 1-7, wherein generating the first container image based on the first container image version of the plurality of container image versions further comprises: selecting the first container image version of the plurality of container image versions based on one or more environmental variables associated with the computing environment.

Example 9 is the method of any of Examples 1-8, wherein the one or more environmental variables comprise at least one of: an indication of a current availability or current workload of one or more resources associated with the computing environment, an indication of one or more license restrictions associated with the computing environment, or an indication of one or more access rights of a user associated with the computing environment.

Example 10 is the method of any of Examples 1-9, further comprising detecting, responsive to providing the first container image to the computing environment, a change in the one or more environmental variables associated with the computing environment; selecting a second container image version of the plurality of container image versions based on the change in the one or more environmental variables associated with the computing environment; generating a second container image based on the second container image version of the plurality of container image versions; and providing the second container image to the computing environment to cause one or more processors of the computing environment to execute the second container image.

Example 11 is the method of any of Examples 1-10, wherein providing the second container image to the computing environment further causes the computing environment to (a) disable the second container image prior to executing the second container image, or (b) concurrently execute the first container image and the second container image to load balance one or more workloads across the first container image and the second container image.

Example 12 is a system comprising a memory; and a processing device, operatively coupled to the memory, to receive a request to generate a container image comprising a plurality of unique layers; determine a set of optional layers for each unique layer of the container image based on a plurality of tags associated with the container image; define one or more container image versions of the container image, wherein each container image version is defined by selecting, for each unique layer of the container image based on the plurality of tags, the unique layer of the container image or one of the optional layers of the set of optional layers associated with the unique layer; and generate a first container image based on a first container image version of the one or more container image versions.

Example 13 is the system of Example 12, wherein each tag is indicative of one or more rules for executing a respective unique layer of the plurality of unique layers of the container image.

Example 14 is the system of any of Examples 12-13, wherein the one or rules comprises at least one of a first rule defining a minimum set of computing resources to optimally execute the unique layer of the plurality of unique layers; a second rule defining how an execution of one or more of other unique layers of the container image interact the unique layer; or a third rule defining the set of optional layers associated with the unique layer of the plurality of unique layers.

Example 15 is the system of any of Examples 12-14, wherein the unique layer and each optional layer of the set of optional layers use different computing resources or different application programming interfaces (APIs) to provide a substantially identical service.

Example 16 is the system of any of Examples 12-15, wherein to define the one or more container image versions of the container image, the processing device to: generate a container image file comprising the one or more container image versions, wherein a first container image version of the one or more container image versions comprises Boolean logic that indicates the set of optional layers for a first unique layer of the first container image version; and to generate the first container image based on the first container image version of the one or more container image versions, the processing device to generate the first container further based on the container image file.

Example 17 is the system of any of Examples 12-16, wherein to select, for each unique layer of the container image based on the plurality of tags, the unique layer of the container image or the one of the optional layers of the set of optional layers associated with the unique layer, the processor to: select, for a first container image version of the one or more container image versions of the container image, a first unique layer of the plurality of unique layers of the container image; determine an incompatibility between the first unique layer and a second optional layer of the set of optional layers associated with a second unique layer of the container image; and select, for the first container image version responsive to determining the incompatibility, a first optional layer of the set of optional layers associated with the second unique layer of the container image.

Example 18 is the system of any of Examples 12-17, wherein the processing device to: provide the first container image to a computing environment to cause one or more processors of the computing environment to execute the first container image.

Example 19 is the system of any of Examples 12-18, wherein to generate the first container image based on the first container image version of the one or more container image versions, the processing device to select the first container image version of the one or more container image versions based on one or more environmental variables associated with the computing environment.

Example 20 is a non-transitory computer-readable medium storing instructions that, when execute by a processing device, cause the processing device to receive a request to generate a container image comprising a plurality of unique layers; determine a set of optional layers for each unique layer of the container image based on a plurality of tags associated with the container image; define, by a processing device, one or more container image versions of the container image, wherein each container image version is defined by selecting, for each unique layer of the container image based on the plurality of tags, the unique layer of the container image or one of the optional layers of the set of optional layers associated with the unique layer; and generate a first container image based on a first container image version of the one or more container image versions.

Example 21 is an apparatus comprising means for receiving a request to generate a container image comprising a plurality of unique layers; means for determining a set of optional layers for each unique layer of the container image based on a plurality of tags associated with the container image; means for defining, by a processing device, one or more container image versions of the container image, wherein each container image version is defined by selecting, for each unique layer of the container image based on the plurality of tags, the unique layer of the container image or one of the optional layers of the set of optional layers associated with the unique layer; and means for generating a container image file comprising the one or more container image versions.

Example 22 is the apparatus of Example 21, wherein each tag is indicative of one or more rules for executing a respective unique layer of the plurality of unique layers of the container image.

Example 23 is the apparatus of any of Examples 21-22, wherein the one or rules comprises at least one of: a first rule defining a minimum set of computing resources to optimally execute the unique layer of the plurality of unique layers; a second rule defining how an execution of one or more of other unique layers of the container image interact the unique layer; or a third rule defining the set of optional layers associated with the unique layer of the plurality of unique layers.

Example 24 is the apparatus of any of Examples 21-23, wherein the unique layer and each optional layer of the set of optional layers use different computing resources or different application programming interfaces (APIs) to provide a substantially identical service.

Example 25 is the apparatus of any of Examples 21-24, wherein a first container image version of the one or more container image versions comprises Boolean logic that indicates the set of optional layers for a first unique layer of the first container image version, and further comprising means for generating, using the container image file, a first container image based on the first container image version of the plurality of container image versions.

Example 26 is the apparatus of any of Examples 21-25, further comprising means for selecting, for a first container image version of the one or more container image versions of the container image, a first unique layer of the plurality of unique layers of the container image; means for determining an incompatibility between the first unique layer and a second optional layer of the set of optional layers associated with a second unique layer of the container image; and means for selecting, for the first container image version responsive to determining the incompatibility, a first optional layer of the set of optional layers associated with the second unique layer of the container image.

Example 27 is the apparatus of any of Examples 21-26, further comprising means for providing the first container image to a computing environment to cause one or more processors of the computing environment to execute the first container image.

Example 28 is the apparatus of any of Examples 21-27, wherein means for generating the first container image based on the first container image version of the plurality of container image versions further comprises: means for selecting the first container image version of the plurality of container image versions based on one or more environmental variables associated with the computing environment.

Example 29 is the apparatus of any of Examples 21-28, wherein the one or more environmental variables comprise at least one of: an indication of a current availability or current workload of one or more resources associated with the computing environment, an indication of one or more license restrictions associated with the computing environment, or an indication of one or more access rights of a user associated with the computing environment.

Example 30 is the apparatus of any of Examples 21-29, further comprising means for detecting, responsive to providing the first container image to the computing environment, a change in the one or more environmental variables associated with the computing environment; means for selecting a second container image version of the plurality of container image versions based on the change in the one or more environmental variables associated with the computing environment; means for generating a second container image based on the second container image version of the plurality of container image versions; and means for providing the second container image to the computing environment to cause one or more processors of the computing environment to execute the second container image.

Example 31 is the apparatus of any of Examples 21-30, wherein means for providing the second container image to the computing environment further causes the computing environment to (a) disable the second container image prior to executing the second container image, or (b) concurrently execute the first container image and the second container image to load balance one or more workloads across the first container image and the second container image.

Unless specifically stated otherwise, terms such as "receiving," "determining," "defining," "generating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A computer-implemented method comprising:
receiving a request to generate a container image comprising a plurality of unique layers;
determining a set of optional layers for each unique layer of the container image based on a plurality of tags associated with the container image responsive to receiving the request to generate the container image, wherein the unique layer and each optional layer of the set of optional layers use different computing resources or different application programming interfaces (APIs) to provide a substantially identical service, wherein the plurality of tags are indicative of one or more rules to define how an execution of one or more of other unique layers of the container image improves an execution speed of the unique layer;
defining, by a processing device, one or more container image versions of the container image, wherein each container image version is defined by selecting, for each unique layer of the container image based on the plurality of tags, the unique layer of the container image or one of the optional layers of the set of optional layers associated with the unique layer; and
generating a first container image based on a first container image version of the one or more of container image versions by selecting the first container image version of the one or more container image versions based on one or more environmental variables associated with a computing environment, wherein the one or more environmental variables comprises an indication of one or more license restrictions associated with the computing environment.

2. The computer-implemented method of claim 1, wherein the one or more rules further at least one of:
define a minimum set of computing resources to optimally execute the unique layer of the plurality of unique layers; or
define the set of optional layers associated with the unique layer of the plurality of unique layers.

3. The computer-implemented method of claim 1, comprising:
generating a container image file comprising the one or more container image versions, wherein the first container image version of the one or more container image versions comprises Boolean logic that indicates the set of optional layers for a first unique layer of the first container image version, wherein generating the first container image based on the first container image version of the one or more container image versions is further based on the container image file.

4. The computer-implemented method of claim 1, wherein selecting, for each unique layer of the container image based on the plurality of tags, the unique layer of the container image or the one of the optional layers of the set of optional layers associated with the unique layer comprises:
selecting, for the first container image version of the one or more container image versions of the container image, a first unique layer of the plurality of unique layers of the container image;
determining an incompatibility between the first unique layer and a second optional layer of the set of optional layers associated with a second unique layer of the container image; and
selecting, for the first container image version responsive to determining the incompatibility, a first optional layer of the set of optional layers associated with the second unique layer of the container image.

5. The computer-implemented method of claim 1, further comprises:
providing the first container image to the computing environment to cause one or more processors of the computing environment to execute the first container image.

6. The computer-implemented method of claim 5, further comprising:
detecting, responsive to providing the first container image to the computing environment, a change in the one or more environmental variables associated with the computing environment;
selecting a second container image version of the one or more container image versions
based on the change in the one or more environmental variables associated with the computing environment;
generating a second container image based on the second container image version of the one or more container image versions; and
providing the second container image to the computing environment to cause one or more processors of the computing environment to execute the second container image.

7. The computer-implemented method of claim 6, wherein providing the second container image to the computing environment further causes the computing environment to disable the second container image prior to executing the second container image, or concurrently execute the first container image and the second container image to load balance one or more workloads across the first container image and the second container image.

8. The computer-implemented method of claim 1, wherein the one or more environmental variables comprise at least one of:
an indication of a current availability or current workload of one or more resources associated with the computing environment, or
an indication of one or more access rights of a user associated with the computing environment.

9. A system comprising:
a memory; and
a processing device, operatively coupled to the memory, to:
receive a request to generate a container image comprising a plurality of unique layers;
determine a set of optional layers for each unique layer of the container image based on a plurality of tags associated with the container image responsive to receiving the request to generate the container image, wherein the unique layer and each optional layer of the set of optional layers use different computing resources or different application programming interfaces (APIs) to provide a substantially identical service, wherein the plurality of tags are indicative of one or more rules to define how an execution of one or more of other unique layers of the container image improves an execution speed of the unique layer;
define one or more container image versions of the container image, wherein each container image version is defined by selecting, for each unique layer of the container image based on the plurality of tags, the unique layer of the container image or one of the optional layers of the set of optional layers associated with the unique layer; and generate a first container image based on a first container image version of the one or more container image versions by selecting the first container image version of the one or more container image versions based on one or more environmental variables associated with a computing environment, wherein the one or more environmental variables comprises an indication of one or more license restrictions associated with the computing environment.

10. The system of claim 9, wherein the one or more rules further at least one of:
   define a minimum set of computing resources to optimally execute the unique layer of the plurality of unique layers;
   define the set of optional layers associated with the unique layer of the plurality of unique layers.

11. The system of claim 9, wherein:
   to define the one or more container image versions of the container image, the processing device to: generate a container image file comprising the one or more container image versions, wherein the first container image version of the one or more container image versions comprises Boolean logic that indicates the set of optional layers for a first unique layer of the first container image version; and
   to generate the first container image based on the first container image version of the one or more container image versions, the processing device to generate the first container image further based on the container image file.

12. The system of claim 9, wherein to select, for each unique layer of the container image based on the plurality of tags, the unique layer of the container image or the one of the optional layers of the set of optional layers associated with the unique layer, the processing device to:
   select, for the first container image version of the one or more container image versions of the container image, a first unique layer of the plurality of unique layers of the container image;
   determine an incompatibility between the first unique layer and a second optional layer of the set of optional layers associated with a second unique layer of the container image; and
   select, for the first container image version responsive to determining the incompatibility, a first optional layer of the set of optional layers associated with the second unique layer of the container image.

13. The system of claim 9, wherein the processing device to:
   provide the first container image to the computing environment to cause one or more processors of the computing environment to execute the first container image.

14. A non-transitory computer-readable medium storing instructions that, when execute by a processing device, cause the processing device to:
   receive a request to generate a container image comprising a plurality of unique layers;
   determine a set of optional layers for each unique layer of the container image based on a plurality of tags associated with the container image responsive to receiving the request to generate the container image, wherein the unique layer and each optional layer of the set of optional layers use different computing resources or different application programming interfaces (APIs) to provide a substantially identical service, wherein the plurality of tags are indicative of one or more rules to define how an execution of one or more of other unique layers of the container image improves an execution speed of the unique layer;
   define, by the processing device, one or more container image versions of the container image, wherein each container image version is defined by selecting, for each unique layer of the container image based on the plurality of tags, the unique layer of the container image or one of the optional layers of the set of optional layers associated with the unique layer; and
   generate a first container image based on a first container image version of the one or more container image versions by selecting the first container image version of the one or more container image versions based on one or more environmental variables associated with a computing environment, wherein the one or more environmental variables comprises an indication of one or more license restrictions associated with the computing environment.

* * * * *